US011983778B2

(12) United States Patent
Walsh et al.

(10) Patent No.: US 11,983,778 B2
(45) Date of Patent: May 14, 2024

(54) SYSTEMS AND METHODS TO REMOTELY MONITOR MACHINE USAGE

(71) Applicant: HARTFORD FIRE INSURANCE COMPANY, Hartford, CT (US)

(72) Inventors: Connor Walsh, Lake Forest, IL (US); Maureen King, Burlington, CT (US); Nandini Kannappan, Lewis Center, OH (US); Matthew Lamoureux, Glastonbury, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 17/742,815

(22) Filed: May 12, 2022

(65) Prior Publication Data

US 2023/0368301 A1 Nov. 16, 2023

(51) Int. Cl.
*G06Q 40/08* (2012.01)
*G07C 5/00* (2006.01)
*G07C 5/08* (2006.01)

(52) U.S. Cl.
CPC .............. *G06Q 40/08* (2013.01); *G07C 5/008* (2013.01); *G07C 5/0808* (2013.01)

(58) Field of Classification Search
CPC ....... G06Q 40/08; G07C 5/008; G07C 5/0808
USPC .......................................................... 705/4
See application file for complete search history.

(56) References Cited

U.S. PATENT DOCUMENTS

| 9,361,599 | B1* | 6/2016 | Biemer ................. G06Q 40/08 |
| 9,390,452 | B1 | 7/2016 | Biemer et al. |
| 10,096,038 | B2 | 10/2018 | Ramirez et al. |
| 10,157,422 | B2 | 12/2018 | Jordan Peters et al. |
| 10,586,288 | B2 | 3/2020 | Biemer et al. |
| 10,817,950 | B1 | 10/2020 | Iqbal et al. |
| 10,830,605 | B1 | 11/2020 | Chintakindi et al. |
| 11,068,990 | B1* | 7/2021 | Floyd .................... G06F 16/27 |
| 11,069,159 | B1 | 7/2021 | Brinkmann et al. |
| 2014/0108058 | A1 | 4/2014 | Bourne et al. |
| 2019/0005588 | A1* | 1/2019 | Carver .................. G06Q 40/08 |
| 2019/0164229 | A1 | 5/2019 | Sbianchi |
| 2020/0134735 | A1* | 4/2020 | Carver .................. G06Q 40/08 |
| 2020/0334762 | A1* | 10/2020 | Carver .................. G06Q 40/08 |

* cited by examiner

*Primary Examiner* — Hai Tran
(74) *Attorney, Agent, or Firm* — Buckley, Maschoff & Talwalkar LLC

(57) ABSTRACT

Embodiments may monitor utilization of a machine. A risk relationship data store may contain electronic records that represent a plurality of risk relationships with an enterprise. A device located proximate to the machine includes a plurality of sensors, each sensor configured to monitor at least one parameter (e.g., acceleration, speed, mileage, runtime and location sensors, etc.). A back-end application computer server may calculate an operator behavior score and a machine operation score based on sensor signals. The computer server may also determine a machine characteristics score and an amount of utilization associated with the machine. A risk relationship identifier associated with the machine is identified, and the computer server may automatically and dynamically update a resource amount associated with the risk relationship identifier based on the operator behavior score, the machine operation score, the machine characteristics score, and the amount of utilization associated with the machine.

23 Claims, 16 Drawing Sheets

| VEHICLE IDENTIFIER 1402 | CUSTOMER NAME (POLICY NO.) 1404 | DRIVER BEHAVIOR SCORE 1406 | VEHICLE OPERATION SCORE 1408 | VEHICLE CHARACTERISTICS SCORE 1410 | ... | INSURANCE PREMIUM 1412 |
|---|---|---|---|---|---|---|
| V_10001 | JANE DOE (P_123456) | | | | ... | 5¢/MILE |
| V_10002 | JOHN WEST (P_654321) | | | | ... | 4¢/MILE |
| V_10003 | SHIRLEY GREENE (P_121212) | | | | ... | 8¢/MILE |

SYSTEMS AND METHODS TO REMOTELY MONITOR MACHINE USAGE

BACKGROUND

Machines, such as motor vehicles and the like, may be used by operators. In some cases, a machine is associated with a risk relationship with an enterprise, such as insurer. The level of risk associated with the machine may be based on, among other factors, how much the machine is utilized (e.g., how far a vehicle was driven). When asked, operators of machines might misrepresent or underrepresent how they use their machines. Sometimes such misrepresentations are intentional to enable the user to obtain certain benefits. Other times, operators do not even realize how much they operate the machine. As such, a need exists for electronics for remotely monitoring the use of a machine. Moreover, it may be desirable to provide systems and methods for remotely monitoring the use of a machine that provides secure, accurate results.

SUMMARY OF THE INVENTION

According to some embodiments, systems, methods, apparatus, computer program code and means are provided for remotely monitoring the use of a machine that provides secure, accurate results and that allow for flexibility and effectiveness when responding to those results. Some embodiments may monitor utilization of a machine. A risk relationship data store may contain electronic records that represent a plurality of risk relationships with an enterprise. A device located proximate to the machine includes a plurality of sensors, each sensor configured to monitor at least one parameter (e.g., acceleration, speed, mileage, run-time and location sensors, etc.). A back-end application computer server may calculate an operator behavior score and a machine operation score based on sensor signals. The computer server may also determine a machine characteristics score and an amount of utilization associated with the machine. A risk relationship identifier associated with the machine is identified, and the computer server may automatically and dynamically update a resource amount associated with the risk relationship identifier based on the operator behavior score, the machine operation score, the machine characteristics score, and the amount of utilization associated with the machine.

Some embodiments comprise: means for accessing, by a back-end application computer server, a risk relationship data store that contains electronic records representing, for each of a plurality of risk relationships with an enterprise: a risk relationship identifier, at least one attribute value, and a resource amount; means for receiving, at the back-end application computer server, machine information representing utilization of the machine, including at least one of geo-position information and machine kinematics data, via a distributed communication network; means for determining a risk relationship identifier associated with the received machine information; based on the received machine information, means for calculating an operator behavior score; based on the received machine information, means for calculating a machine operation score; means for determining a machine characteristics score; means for determining an amount of utilization associated with the machine; means for automatically and dynamically updating a resource amount associated with the determined risk relationship identifier based on the operator behavior score, the machine operation score, the machine characteristics score, and the amount of utilization associated with the machine; and means for updating the appropriate electronic record in the risk relationship data store with the updated resource amount.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way for remotely monitoring the use of a machine that provides secure, accurate results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 14 is a portion of a risk relationship database in accordance with some embodiments.

DETAILED DESCRIPTION

Figure 1:
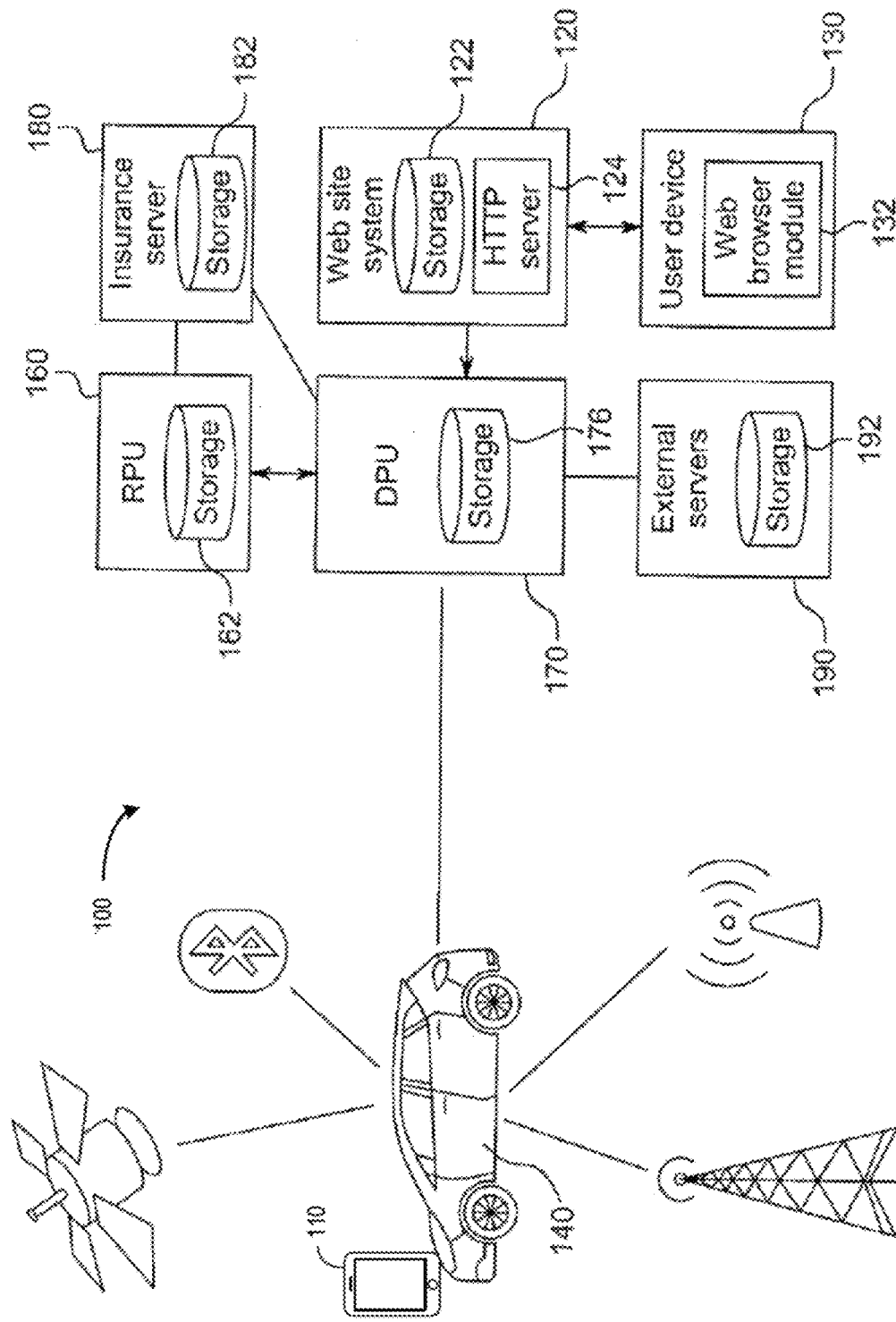
FIG. 1 shows an example system architecture that may be used for remotely monitoring the use of a vehicle according to some embodiments.

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of machine monitoring, control, and/or analysis by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via a back-end-end application server to accurately improve machine learning algorithms and the exchange of information, thus improving the overall efficiency of the system associated with message storage requirements and/or bandwidth considerations (e.g., by reducing the number of messages that need to be transmitted via a network). Moreover, embodiments associated with collecting accurate information might further improve risk values, predictions of risk values, allocations of resources, risk relationship decisions, etc.

A system and method configured to monitor use conditions of a vehicle and provide feedback to a user of the vehicle to maintain use within certain parameters is described. The description includes a plurality of sensors located proximate to the vehicle, each sensor configured to monitor at least one vehicle parameter, the plurality of sensors selected from an accelerometer, speed, temperature, mileage, oil level, oil pressure, run-time and location sensors, each sensor generating a signal encapsulating the monitored vehicle parameter and transmitting the generated signal to a control unit. The description includes a control unit that receives the generated signal from each of a plurality of sensors, the control unit including a memory that stores the received signal and selectively combines the received signal with other signals received from others of the plurality of sensors. The description includes a first transmitter coupled to the control unit capable of transmitting the combined signal. The description includes a second transceiver remote from the vehicle that receives a transmitted condition, and compares that condition to received conditions from other vehicles and provides feedback to adjust the use of the vehicle based on the comparison, and a user interface for providing feedback to a user including at least one of visual indication, audible indication, and physically altering the use of the vehicle. The description includes coupling of the plurality of sensors to the control unit with a Controller Area Network ("CAN") bus protocol. The first transmitter may transmit over a Radio Frequency ("RF") network.

FIG. 1 shows an example system 100 that may be used for monitoring a vehicle. The example system 100 includes a vehicle 140 having an operator with a smartphone 110 executing a telematics application such as a TrueLane® application. The telematics devices may further include On-Board Diagnostic ("OBD" devices, tablets, laptops, OEM connectivity devices, and/or similar devices. The vehicle 140 may be in communication with multiple devices over different networks, including a satellite, a cellular station, a Wi-Fi hotspot, BLUETOOTH® devices, and/or the smartphone 110 (which might instead communicate directly with cellular stations and/or Wi-Fi hotspots and not the vehicle 140). The smartphone 110 may be operated by a third-party vendor that collects telematics data. The smartphone 110 may include storage. The smartphone 110 may sense and collect the telematics data and then transmit the telematics data to a Data Processing Unit ("DPU") 170. The telematics data may be communicated to the DPU 170 in any number of formats. The telematics data may be transmitted as raw data, it may be transmitted as summary data, or it may be transmitted in a format requested by the DPU 170. For example, the DPU 170 may transmit a customized summary of the telematics data to the DPU 170, in a format usable by the DPU 170. The DPU 170 may also be configured to communicate with a Risk and Pricing Unit ("RPU") 160 including storage 162, insurance servers 180, including storage 182, and external servers 190 (e.g. social media networks, official/government networks), which are all connected by one or more networks.

The one or more telematics devices associated with the vehicle 140 may communicate with a satellite, Wi-Fi hotspot, BLUETOOTH® devices and even other vehicles. In some embodiments, the telematics devices associated with the vehicle 140 report this information to the smartphone 110 which may also directly detect telematics data. As will be described in greater detail hereafter, the smartphone 110 or other vehicle device may transmit this telematics data to the DPU 170 which may be configured to consolidate biographic and telematics data to monitor the use of the vehicle 140.

The web site system 120 provides a web site that may be accessed by a user device 130. The web site system 120 includes a Hypertext Transfer Protocol ("HTTP") server module 124 and a database 122. The HTTP server module 124 may implement the HTTP protocol, and may communicate Hypertext Markup Language ("HTML") pages and related data from the web site to/from the user device 130 using HTTP. The web site system 120 may be connected to one or more private or public networks (such as the Internet), via which the web site system 120 communicates with devices such as the user device 130. The web site system 120 may generate one or more web pages that provide communication setting information, may communicate the web pages to the user device 130, and may receive responsive information from the user device 130.

The HTTP server module 124 in the web site system 120 may be, for example, an APACHE® HTTP server, a SUN-ONE® Web Server, a MICROSOFT® Internet Information Services ("ITS") server, and/or may be based on any other appropriate HTTP server technology. The web site system 120 may also include one or more additional components or modules (not depicted), such as one or more load balancers, firewall devices, routers, switches, and devices that handle power backup and data redundancy.

The user device 130 may be, for example, a cellular phone (including the smartphone 110), a desktop computer, a laptop computer, a tablet computer, or any other appropriate computing device. The user device 130 may further be configured to operate as a telematics device. The user device 130 includes a web browser module 132, which may communicate data related to the web site to/from the HTTP server module 124 in the web site system 120. The web browser module 132 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 132 may implement Rich Internet Application ("RIA") and/or multimedia technologies such as ADOBE® FLASH, MICROSOFT® SILVERLIGHT, and/or other technologies. The web browser module 132 may implement RIA and/or multimedia technologies using one or more web browser plug-in modules (such as, for example, an ADOBE® FLASH or MICROSOFT® SILVERLIGHT plug-in), and/or using one or more sub-modules within the web browser module 132 itself. The web browser module 132 may display data on one or more display devices (not depicted) that are included in or connected to the user device 130, such as a Liquid Crystal Display ("LCD") or monitor. The user device 130 may receive input from the user of the user device 130 from input devices (not depicted) that are included in or connected to the user device 130, such as a keyboard, a mouse, or a touch screen, and provide data that indicates the input to the web browser module 132.

The example system 100 of FIG. 1 may also include one or more wired and/or wireless networks (not depicted), via which communications between the elements in the example system 100 may take place. The networks may be private or public networks, and/or may include the Internet.

Each or any combination of the modules shown in FIG. 1 may be implemented as one or more software modules, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules may perform any of the functionality described herein.

The smartphone 110 or other vehicle device may include one or more sensors, such as an accelerometer, speed and location sensors, for example. By way of non-limiting example only, these sensors may include temperature as well as systems that provide other types of vehicle data. Other types of sensors including impact sensors, chemical sensors and pressure sensors may be utilized in the present system.

Figure 2:
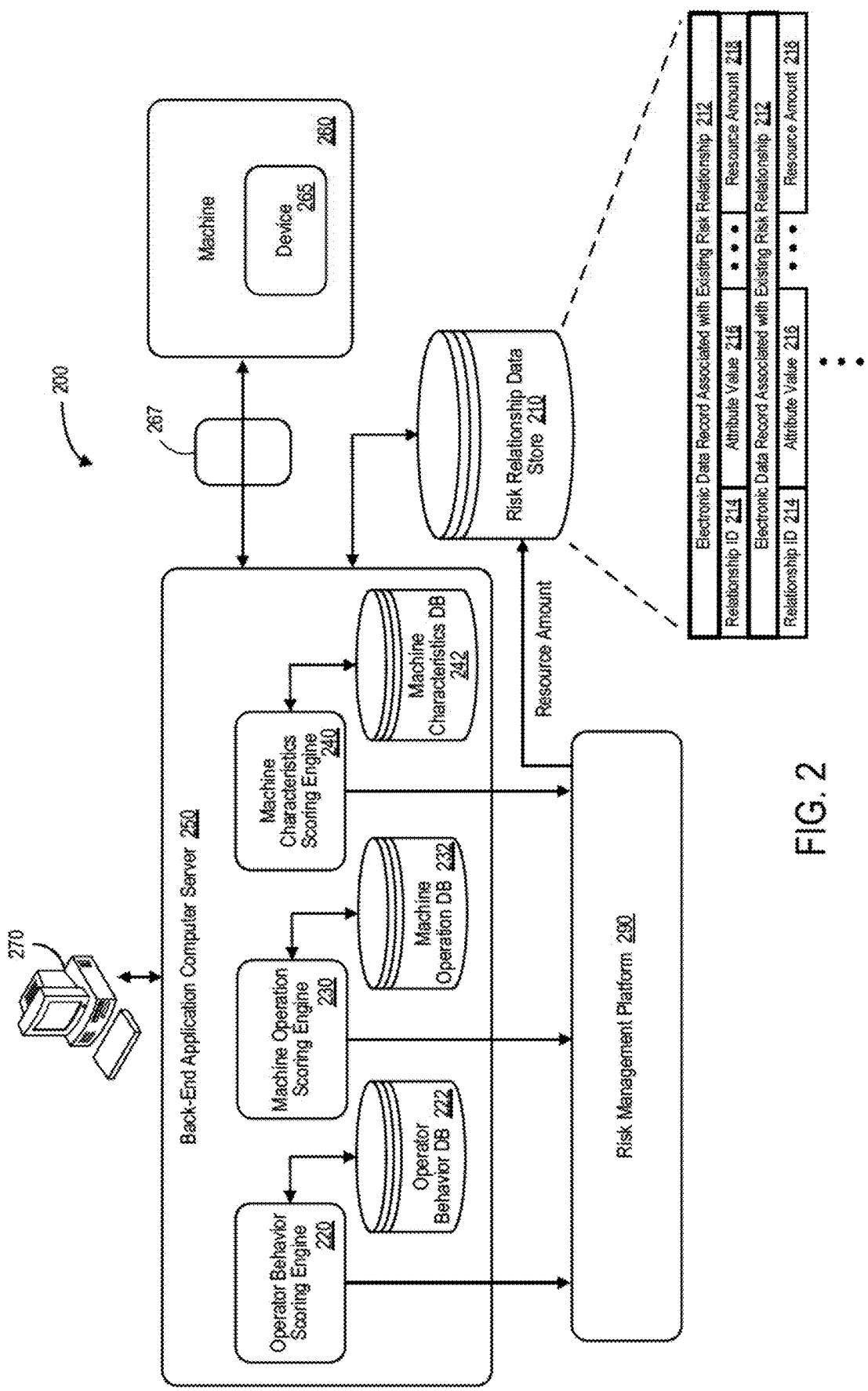
FIG. 2 is a high-level block diagram of a system in accordance with some embodiments.

FIG. 2 is a high-level block diagram of a system 200 according to some embodiments of the present invention. In particular, the system 200 includes a back-end application computer server 250 that may access information in a risk relationship data store 210 (e.g., storing a set of electronic records 212 representing risk associations, each record including, for example, one or more risk relationship identifiers 214, attribute values 216, resource amounts 218, etc.). The back-end application computer server 250 may also retrieve information from other data stores or sources in connection with a driver prediction algorithm (e.g., trained via machine learning) to update the electronic records based on a likely driver of a vehicle. The back-end application computer server 250 may also exchange information with a remote machine 260 or device 265 associated with the machine 260 (e.g., via a firewall 267). According to some embodiments, an interactive graphical user interface platform of the back-end application computer server 250 (and, in some cases, third-party data) may facilitate forecasts, decisions, predictions, and/or the display of results via one or more remote administrator computers 270 (e.g., to gather additional information about an existing association) and/or the remote machine device 260. Note that the back-end application computer server 250 and/or any of the other devices and methods described herein might be associated with a third-party, such as a vendor that performs a service for an enterprise.

According to some embodiments, the back-end application computer server 250 includes an operator behavior scoring engine 220 and operator behavior database 222. The operator behavior scoring engine 220 may generate a score (e.g., indicating the level of risk associated with the operator's behavior) and provide that score to a risk management platform 290. In addition, the back-end application computer server 250 may include a machine operation scoring engine 230 and machine operation database 232. The machine operation scoring engine 230 may generate a score (e.g., indicating the level of risk associated with how the machine 260 is being operated) and provide that score to the risk management platform 290. Similarly, the back-end application computer server 250 may include a machine characteristics scoring engine 240 and machine characteristics database 242. The machine characteristics scoring engine 240 may generate a score (e.g., indicating the level of risk associated with that type of machine 260) and provide that score to the risk management platform 290. The risk management platform 290 may then use the information from the back-end application computer server 250, along with a level of utilization of the machine 260, to generate an updated resource amount 218 (e.g., using a predictive model as described with respect to FIG. 15).

The back-end application computer server 250 and/or the other elements of the system 200 might be, for example, associated with a Personal Computer ("PC"), laptop computer, smartphone, an enterprise server, a server farm, and/or a database or similar storage devices. According to some embodiments, an "automated" back-end application computer server 250 (and/or other elements of the system 200) may facilitate updates of electronic records in the risk relationship data store 210. As used herein, the term "automated" may refer to, for example, actions that can be performed with little (or no) intervention by a human.

As used herein, devices, including those associated with the back-end application computer server 250 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 250 may store information into and/or retrieve information from the risk relationship data store 210. The risk relationship data store 210 might, for example, store electronic records 212 representing a plurality of existing risk associations, each electronic record 212 having a set of attribute values 216 and a resource amount 218. The risk relationship data store 210 may also contain information about prior and current interactions with parties, including those associated with the remote machines 260. The risk relationship data store 210 may be locally stored or reside remote from the back-end application computer server 250. As will be described further below, the risk relationship data store 210 may be used by the back-end application computer server 250 in connection with the machine device 265 to improve monitoring of the machine 260. Although a single back-end application computer server 250 is shown in FIG. 2, any number of such devices may be included. Moreover, various devices described herein might be combined according to embodiments of the present invention. For example, in some embodiments, the back-end application computer server 250 and risk management platform 290 might be co-located and/or may comprise a single apparatus.

Figure 3:
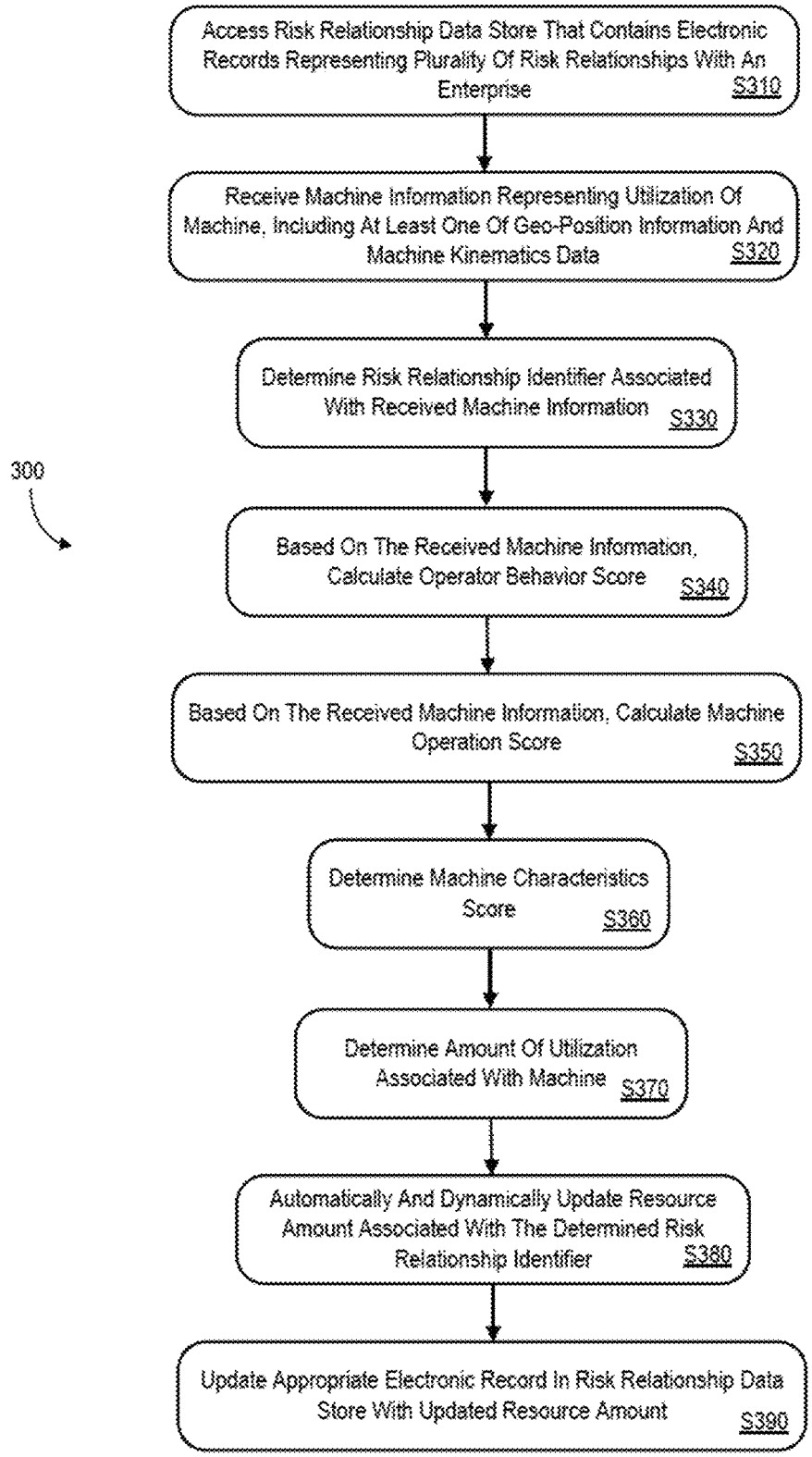
FIG. 3 shows a method to monitor machine utilization according to some embodiments.

Note that the system 200 of FIG. 2 is provided only as an example, and embodiments may be associated with additional elements or components. According to some embodiments, the elements of the system 200 automatically transmit information associated with an interactive user interface display over a distributed communication network. FIG. 3 illustrates a method 300 that might be performed by some or all of the elements of the system 200 described with respect to FIG. 2, or any other system described herein, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a back-end application computer server may access a; risk relationship data store that contains electronic records representing, for each of a plurality of risk relationships with an enterprise: a risk relationship identifier, at least one attribute value (e.g., details about the level of risk), and resource amount. At S320, the computer server may receive machine information representing utilization of a machine, including at least one of geo-position information and machine kinematics data, via a distributed communication network. The machine might comprise, for example, an apparatus that creates widgets in a factory and machine information may be generated by sensors, such as a smartphone, a BLUETOOTH® tag, etc.

At S330, the system may determine a risk relationship identifier associated with the received machine information. Based on the received machine information, at S340 the system may calculate an operator behavior score (e.g., of a worker controlling the machine). Based on the received machine information, the system may calculate a machine operation score at S350 reflecting an amount of risk related that that operator controlling the machine. At S360, the system may determine a machine characteristics score. The machine characteristics score might be associated with a safety feature (e.g., an automatic shut-off switch), a camera, etc.

At S370, the system may determine an amount of utilization (e.g., a number of widgets that have been created) associated with the machine. At S380, the system may automatically and dynamically update the resource amount associated with the determined risk relationship identifier based on the operator behavior score, the machine operation score, the machine characteristics score, and the amount of utilization associated with the machine. At S390, the appropriate electronic record in the risk relationship data store can then be updated with the updated resource amount.

Figure 4:
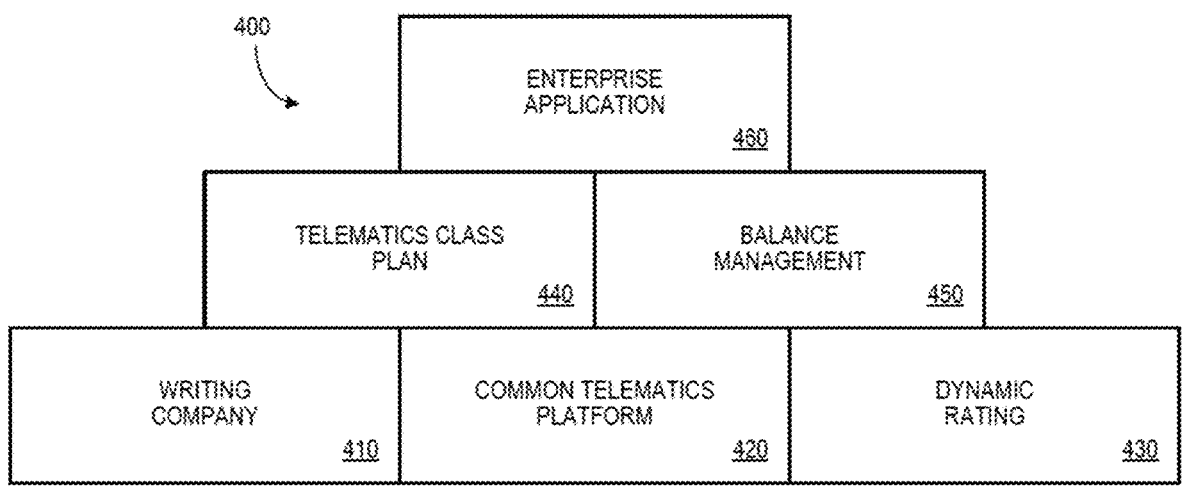
FIG. 4 shows an example of components of a telematics system in accordance with one embodiment.

FIG. 4 shows an example of components of a telematics system 400 in accordance with one embodiment. In particular, the system 400 may include a writing company component 410 associated with a dedicated writing company. Moreover, in some embodiments, a digital call to action may be driven by smartphone notifications, Short Message Service ("SMS"), and/or email communications. The system 400 may also include a common telematics platform component 420 to onboard events using Cloud Trust Protocol ("CTP") and insight APIs. The CTP may onboard to vendor integrations (where needed) and/or push data collected from the application to CTP store APIs.

According to some embodiments, the system 400 also includes a dynamic rating component 430 which might update a base premium annually, bi-annually, monthly, etc. A variable premium may be derived as a rate per mile after each trip (and the rate might apply at a driver and/or vehicle level). In some embodiments, a coverage change may be based on a trip categorization (which may change the rate per mile). The system 400 may also include a telematics class component 440. That is, a class plan may use telematics information as the foundation to minimize or remove the need for data traditionally bought by an enterprise.

The system 400 also includes a balance management component 450 to capture and maintain credit/debit card information. The enterprise may set one or more defined minimum account balance thresholds. In this case, the balance management component 450 may perform an automated account balance "top up" amount selection (e.g., with one-time top up functionality). The balance management component 450 may, in some embodiments, perform calculations to establish a cost for each trip, deduct trip costs from an account balance immediately after trip, deduct a monthly base amount from account where applicable, allow for full pay of a base premium, etc. Finally, an enterprise application component 460 may let customer to complete activation for each driver and car combination. The enterprise application component 460 may allow for balance management by a primary insured, provide visibility to account balance for all insureds (along with a rate per mile for each insured/vehicle combination). The enterprise application component 460 may also show driving trip history (including trip costs to each driver and a policy view of trips for the primary insured). The enterprise application component 460 may include cost projection tools, identification cards, space for notifications and offers, etc.

In this way, the system 400 may determine how, how much, when, where, why, what vehicle is operated, etc.—which provides a step change improvement in insurance premium pricing accuracy as compared to traditional factors (such as credit which are largely only proxies).

Figure 5:
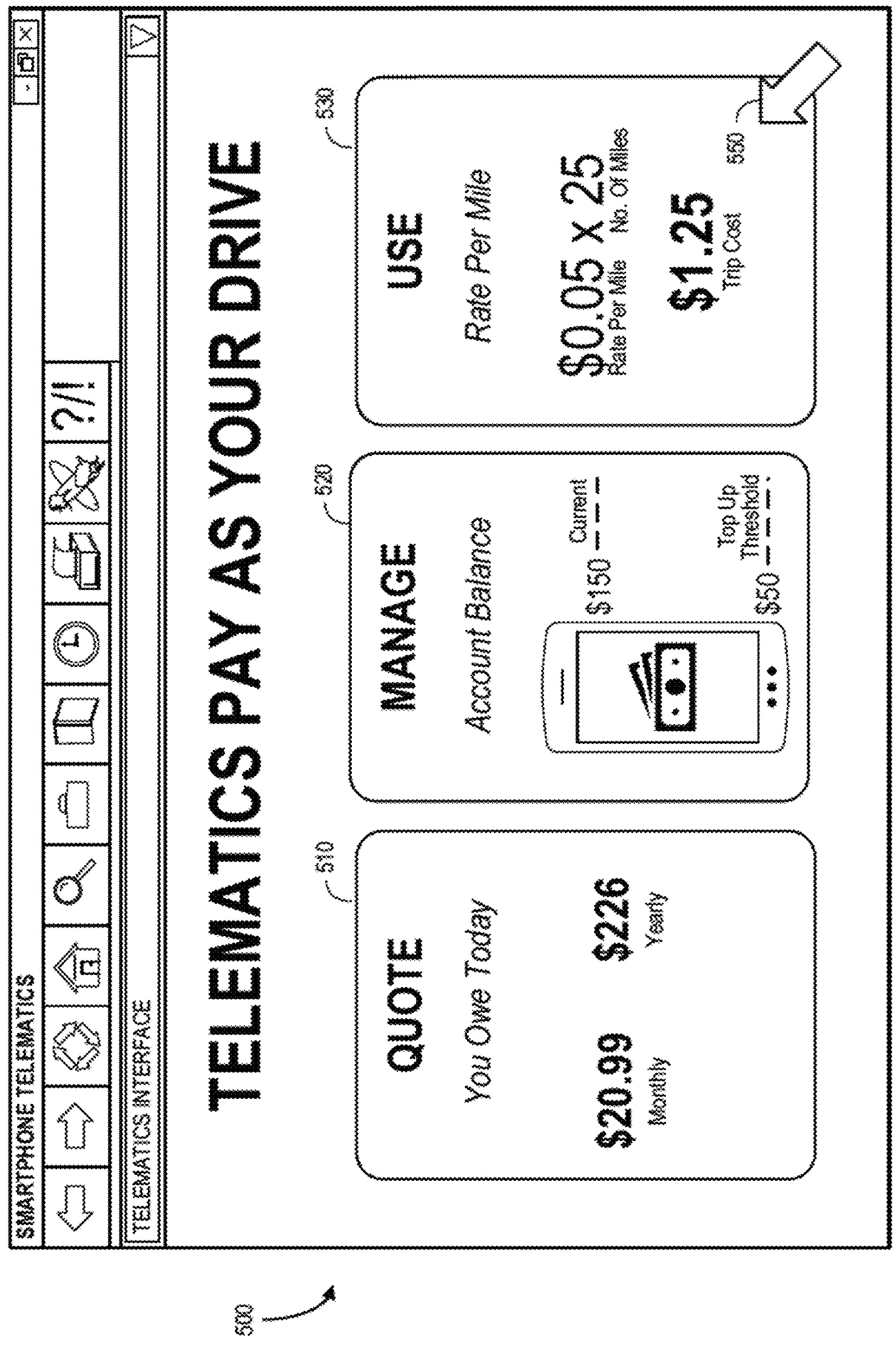
FIG. 5 illustrates a telematics pay-as-you-drive display according to some embodiments.

The information about an updated resource amount (e.g., insurance premium) may be provide via a graphical user interface. For example, FIG. 5 illustrates a telematics pay-as-you-drive display 500 according to some embodiments. The display 500 includes a quote information area 510 that might provide, for example, how much a driver owes in connection with an insurance policy in accordance with any of the embodiments described herein, such as on a subscription basis (e.g., yearly or monthly). The display 500 may also include a manage information area 520 that provides account balance information (e.g., when the system lets a user establish a "wallet" account with an insurer to store funds). The account balance information might include a current balance, a threshold when a "top up" charge to a payment card will be automatically processed, etc. The display 500 may further include a use information area 540 providing a rate per mile rate, a total number of miles travels (e.g., today, this week, or this month) and a calculated total or trip cost. Selection of one of the areas 510, 520, 530 (e.g., via touchscreen or computer mouse pointer 550) may result in a pop-up window providing additional information about that category of information.

Figure 6:
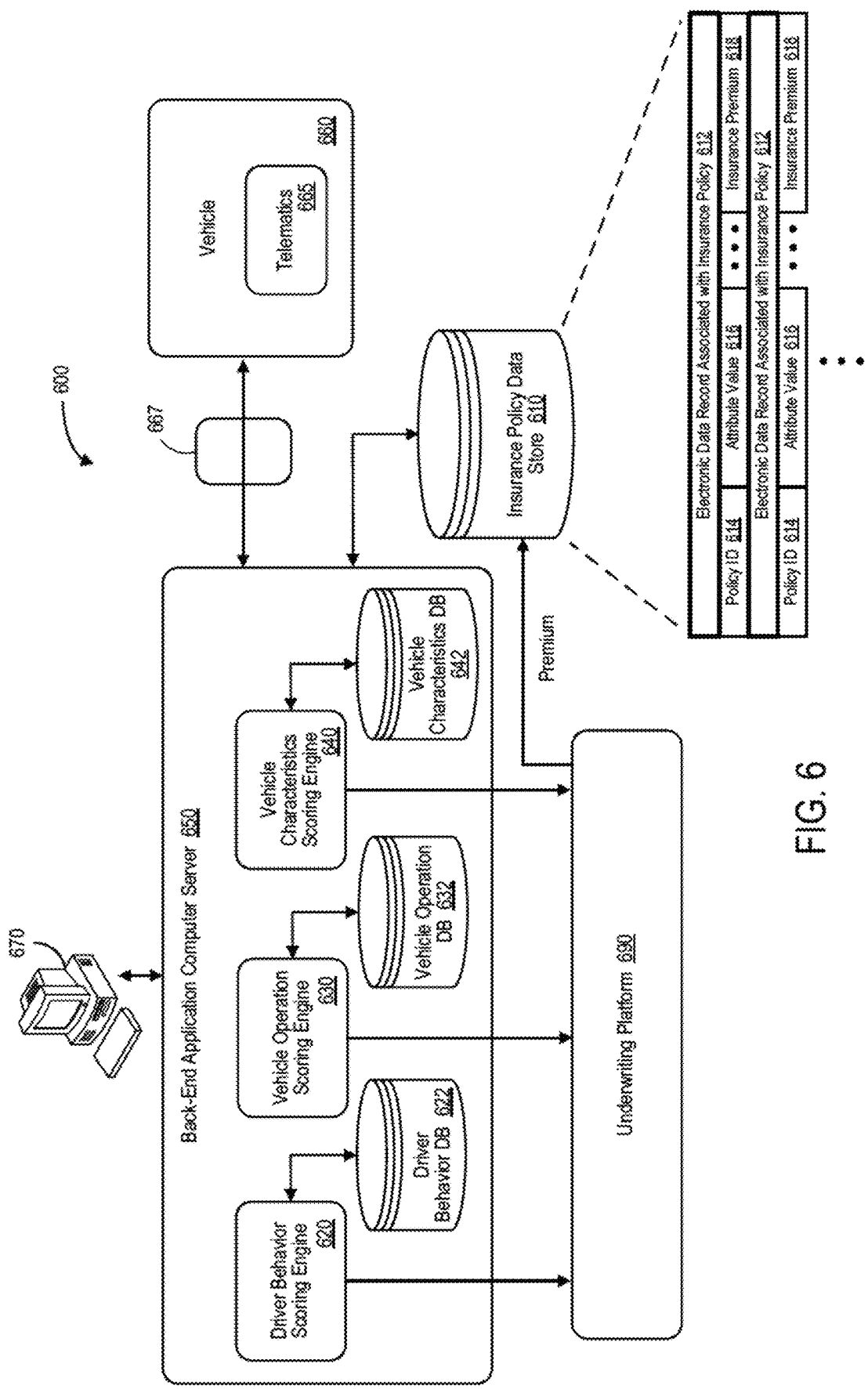
FIG. 6 is a high-level block diagram of a system in accordance with some embodiments.

FIG. 6 is a high-level block diagram of a system 600 in accordance with some embodiments. As before, the system 600 includes a back-end application computer server 650 that may access information in an insurance policy data store 610 (e.g., storing a set of electronic records 612 representing insurance policies of an insurer, each record including, for example, one or more insurance policy identifiers 614, attribute variables 616 (e.g., type of vehicle, claim history, age, etc.), insurance premium values 618, etc. The back-end application computer server 650 may also exchange information with a remote vehicle 660 or telematics device 665 associated with the vehicle 660 (e.g., via a firewall 667). According to some embodiments, an interactive graphical user interface platform of the back-end application computer server 650 (and, in some cases, third-party data) may facilitate forecasts, decisions, predictions, and/or the display of results via one or more remote administrator computers 670 (e.g., to gather additional information about an existing insurance policy) and/or the remote vehicle 660. Note that the back-end application computer server 650 and/or any of the other devices and methods described herein might be associated with a third-party, such as a vendor that performs a service for an enterprise.

According to some embodiments, the back-end application computer server 650 includes a driver behavior scoring engine 620 and driver behavior database 622. The driver behavior scoring engine 620 may generate a score (e.g., indicating the level of risk associated with the driver's past behavior) and provide that score to an underwriting platform 690. In addition, the back-end application computer server 650 may include a vehicle operation scoring engine 630 and vehicle operation database 632. The vehicle operation scoring engine 630 may generate a score (e.g., indicating the level of risk associated with how the vehicle 660 is being driven) and provide that score to the underwriting platform 690. Similarly, the back-end application computer server 650 may include a vehicle characteristics scoring engine 640 and vehicle characteristics database 642. The vehicle characteristics scoring engine 640 may generate a score (e.g., indicating the level of risk associated with that particular type of vehicle 660) and transmit that score to the underwriting platform 690. The underwriting platform 690 may then use the information from the back-end application computer server 650, along with a level of utilization of the vehicle 660 (e.g., a number of miles driven), to generate an updated insurance premium 618.

Figure 7:
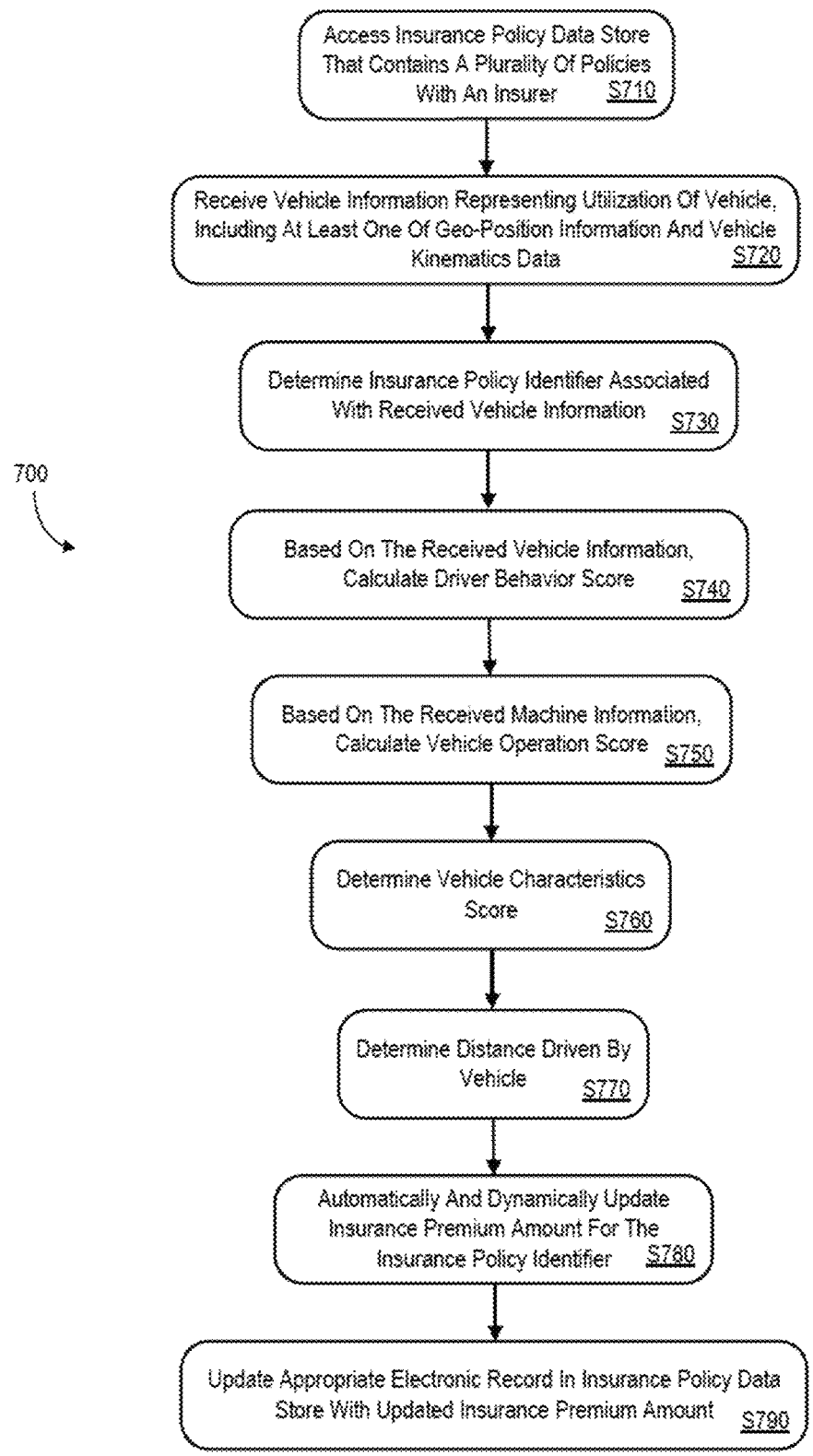
FIG. 7 shows a method for vehicle monitoring according to some embodiments.

FIG. 7 shows a method 700 for vehicle monitoring according to some embodiments. At S710, a back-end application computer server may access an insurance policy data store that contains electronic records representing, for each of a plurality of automobile insurance policies with an insurer: an insurance policy identifier, at least one attribute value, and an insurance premium amount. Note that each automobile insurance policy might represent a potential automobile insurance policy, a newly issued automobile insurance policy, an automobile insurance policy renewal, etc.

At S720, the computer server may receive vehicle information representing utilization of a vehicle, including at least one of geo-position information and machine kinematics data, via a distributed communication network. The vehicle information may be generated by sensors, such as a smartphone, a BLUETOOTH® tag, an On-Board Diagnostics ("OBD") Type II device, a device previously installed in the vehicle (e.g., an Original Equipment Manufacturer ("OEM") device), etc.

At S730, the system may determine an insurance policy identifier associated with the received vehicle information. Based on the received vehicle information, at S740 the system may calculate a driver behavior score. According to some embodiments, the driver behavior score is associated with vehicle speed, vehicle acceleration, vehicle braking, distracted driving (e.g., making a phone call, reviewing text messages, interacting with social media, etc.), a vehicle cornering characteristic, etc. Based on the received vehicle information, the system may calculate a vehicle operation score at S750. The vehicle operation score might be associated with, for example, a time of day, a location, a type of road (e.g., a highway or neighborhood side street), weather information, an amount of traffic, a distance to another vehicle, etc. Another example of a vehicle operation score might include operation of other machines in similar conditions (e.g., how fast do other vehicles typically drive on this particular road segment?). Similarly, a vehicle operation score might be based on a risk hotspot (e.g., a particularly dangerous highway on-ramp, a crowded airport drop-off location, etc.). Still other examples might include a distance to an intersection or a route familiarity characteristic (e.g., is the driver going work as they always do or are they instead in an unfamiliar town?). At S760, the system may determine a vehicle characteristics score. The vehicle characteristics score might be associated with a safety feature, such as anti-lock brakes, cruise control, adaptive headlights, an autonomous operation feature, a camera, an automatic braking feature, a brake warning feature, a parking feature, a lane departure warning, etc.

At S770, the system may determine an amount of utilization (e.g., a number of miles driven) associated with the vehicle. At S780, the system may automatically and dynamically update an insurance premium amount associated with the determined insurance policy identifier based on the driver behavior score, the vehicle operation score, the vehicle characteristics score, and the amount of utilization associated with the vehicle. At S790, the appropriate electronic record in the insurance policy data store can then be updated with the updated insurance premium amount. According to some embodiments, the back-end application computer server may further communicate with an insurance claims engine, a reporting engine, a rating engine, a digital engine, etc.

According to some embodiments, the back-end application computer server includes an account balance management engine that may: maintain a payment card associated with the automobile insurance policy; automatically arrange for a payment based on the updated insurance premium; maintain a balance for the automobile insurance policy; manage a subscription for the automobile insurance policy; automatically initiate a payment when the balance falls below a pre-determined threshold amount, etc.

Figure 8:
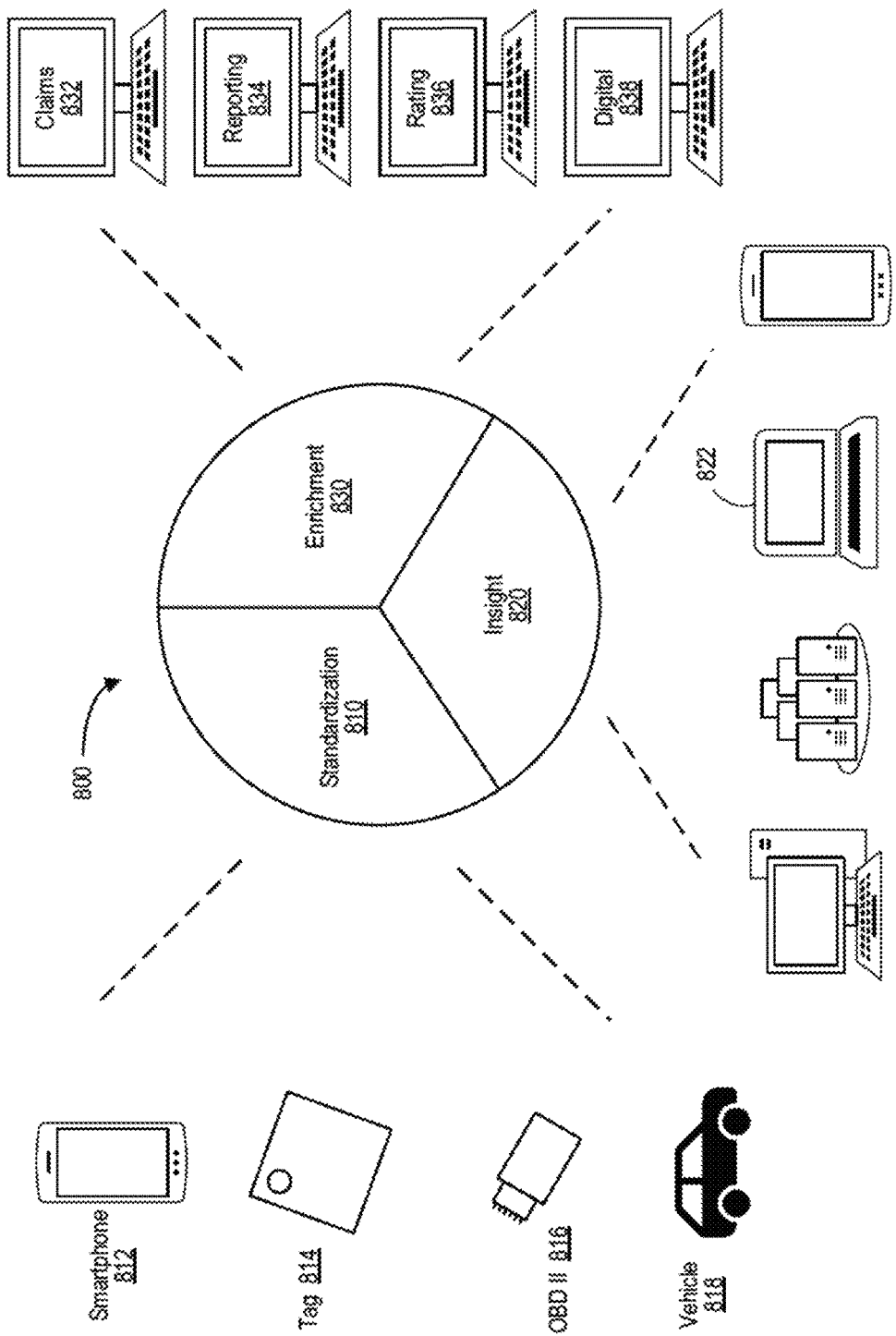
FIG. 8 is a common telematics platform in accordance with some embodiments.

FIG. 8 is a common telematics platform 800 in accordance with some embodiments. The platform 800 may be located within an enterprise that owns responsibility for creating a reusable set of telematics insights and capabilities that supports the acceleration of each line of business strategic objectives. The platform 800 includes standardization 810 that interfaces with smartphones 812, tags 814 (e.g., BLUETOOTH® enabled devices), OBD devices 816, vehicle devices 818, etc. The platform 800 also includes insights 820 that interfaces with servers, cloud resources 822, etc. and enrichment 830 that interfaces with insurance applications, such as claims 832, reporting 834, rating 836, digital 838, etc. In this way, the platform may provide versatility by removing dependence on a specific source of telematics data without refiling. Moreover, the platform 800 may provide speed to market because software can be developed once and use many times allowing for faster development of new capabilities. In addition, the platform 800 may provide insights and attributes by leveraging a common set of internal models and insights. Finally, the platform may facilitate operational scale by using telematics throughout an organization (that is, beyond insurance premium pricing).

According to some embodiments, a telematics pay as you drive user interface may provide tools and guidance to help customers plan for and manage the cost of their insurance.

Figure 9:
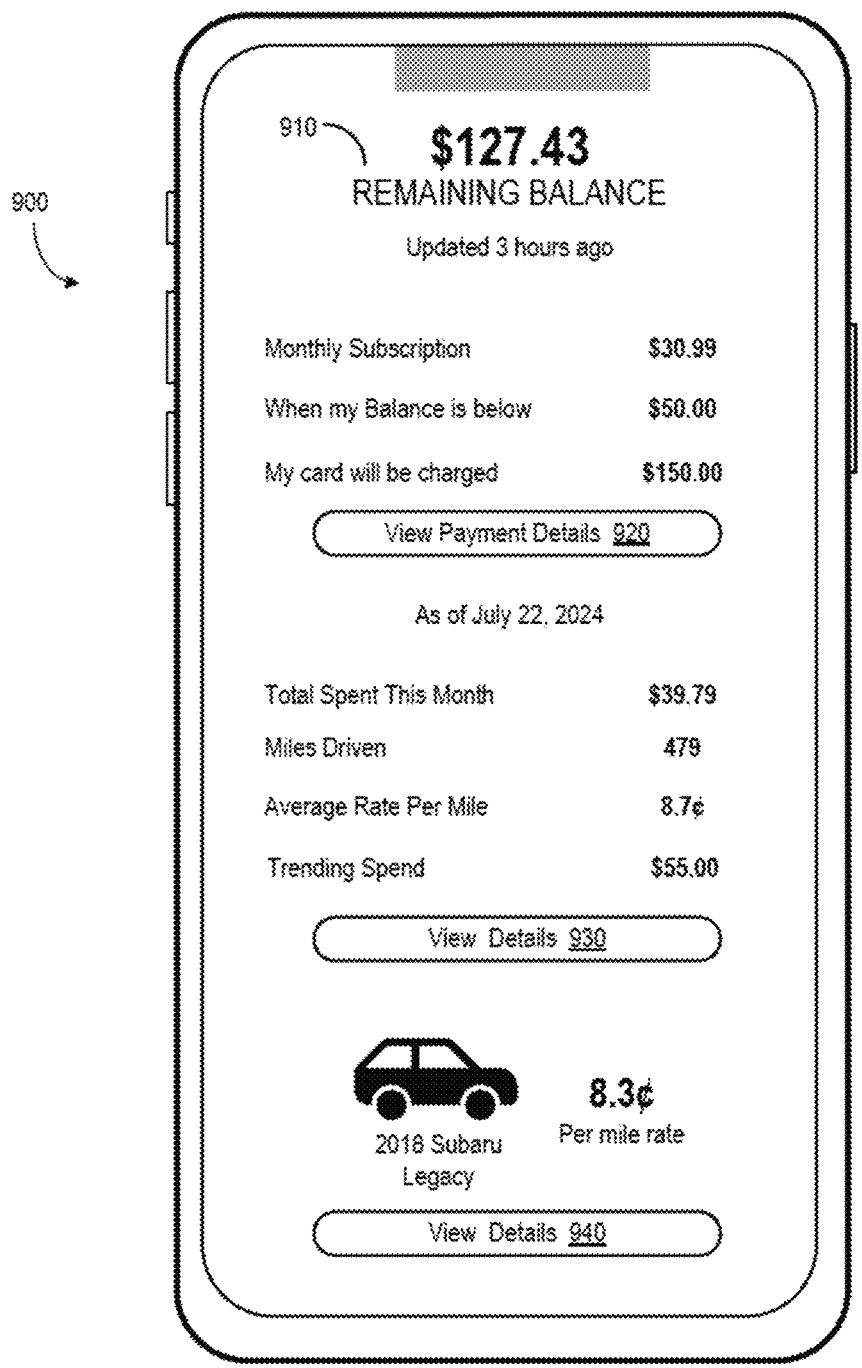
FIG. 9 is a pay-as-you-drive smartphone display according to some embodiments.

For example, FIG. 9 is a pay-as-you-drive smartphone display 900 according to some embodiments. The display 900 includes a remaining balance 910 along with a monthly subscription amount. Selection of a "View Payment Details" icon 920 may let a user update payment card information, change automatic re-fill rules and thresholds, etc. The display also includes a monthly insurance summary along with a "View Details" icon 930 that can be used to find more information. Finally, the display also includes vehicle information (including an insurance premium rate-per-distance) along with a "View Details" icon 940 that lets the user update the vehicle data.

Figure 10:
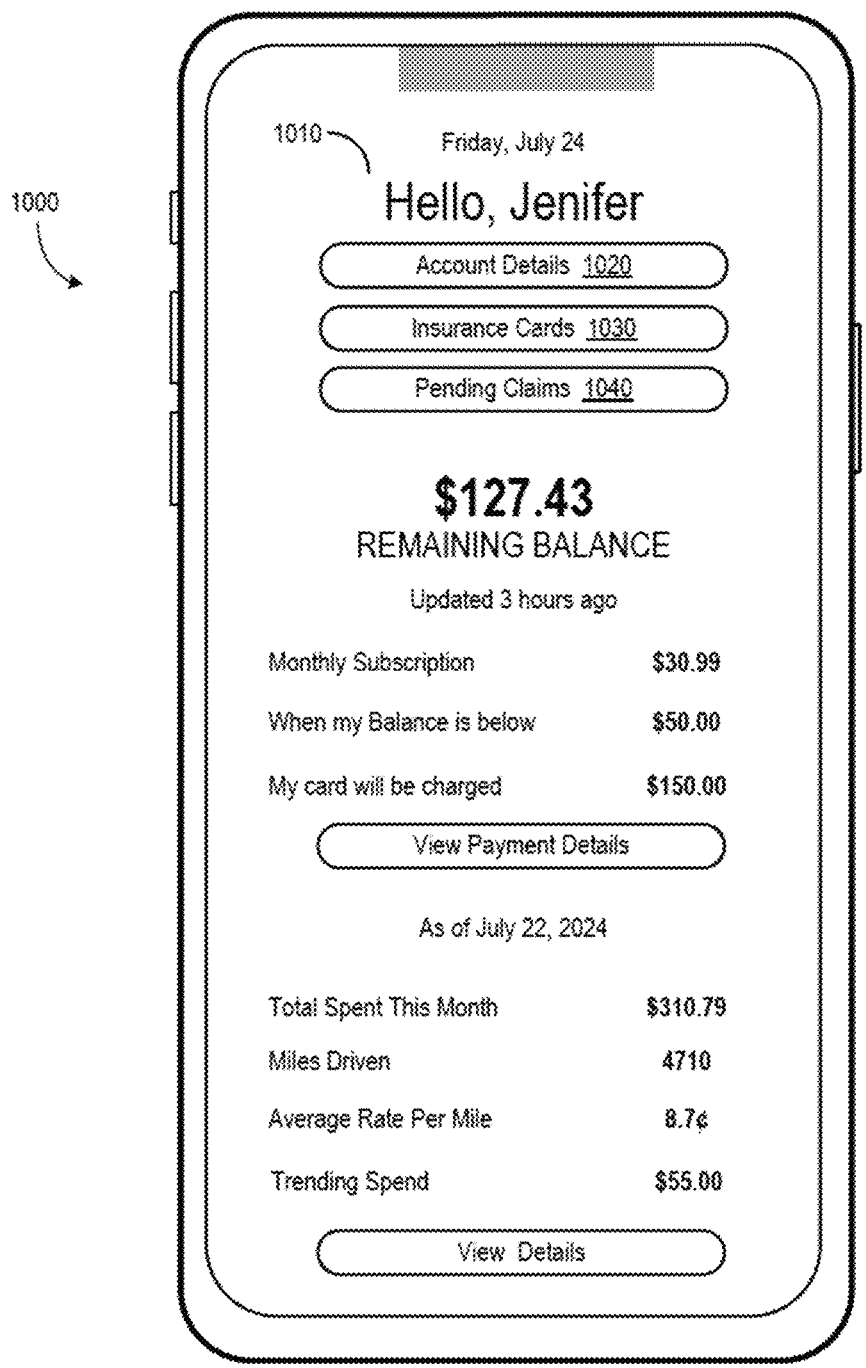
FIG. 10 is a customer account smartphone display in accordance with some embodiments.

The user interface may also facilitate customer servicing. For example, FIG. 10 is a customer account smartphone display 1000 in accordance with some embodiments. The display 1000 includes a user account identifier 1010 and an "Account Details" icon 1020 that can be used to view and alter additional information. The display 1000 also includes an "Insurance Cards" icon 1030 that can be used to access identification cards, and a "Pending Claims" icon 1040 that can be used to access digital insurance claims. In other embodiments, the display 1000 might include ways to interact with an insurance policy view, adjust billing and payment details, etc. In some cases, the user interfaces may be associated with a telematics profile that collects telematics and establishes a driving score for application users.

Figure 11:
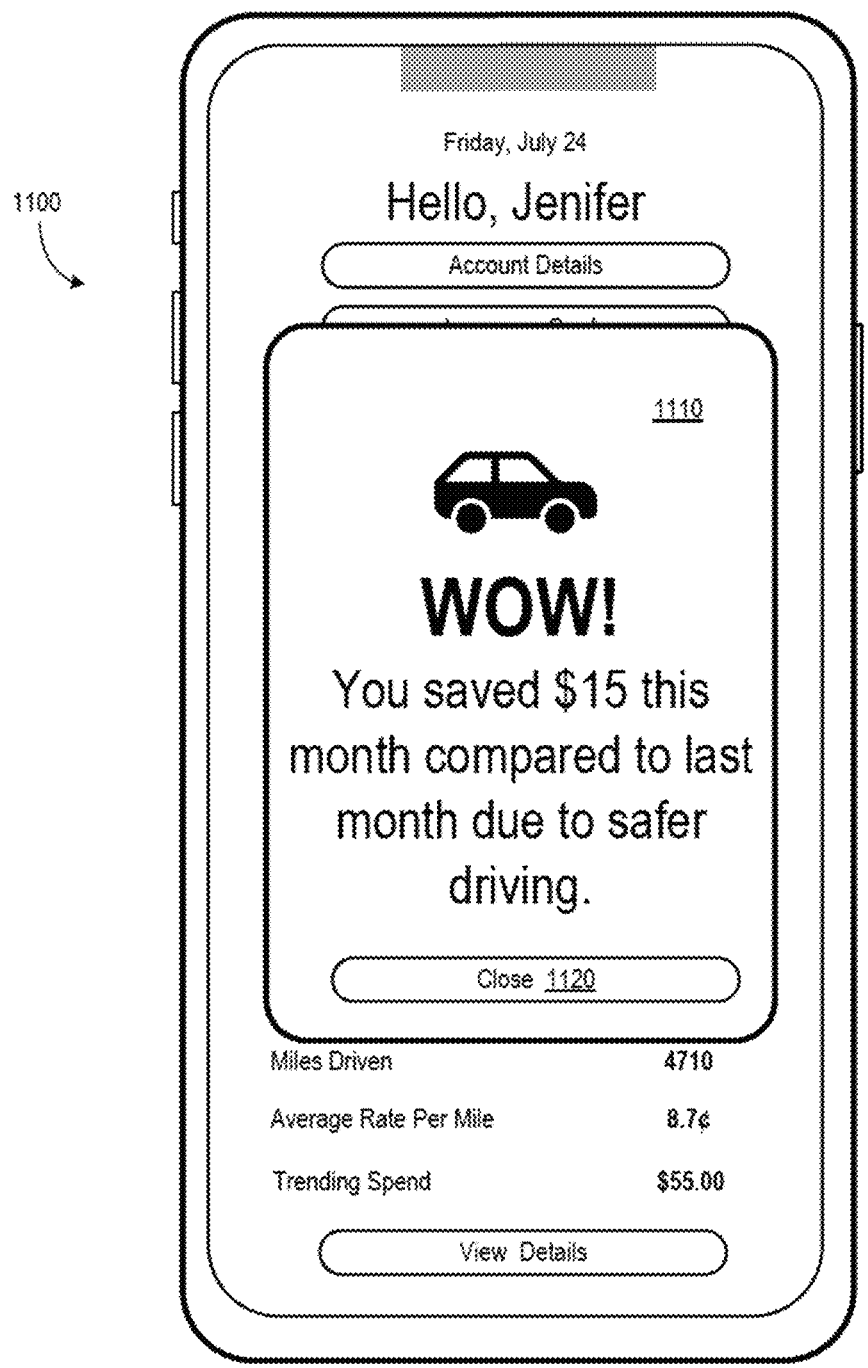
FIG. 11 is a savings announcement smartphone display according to some embodiments.
Figure 12:
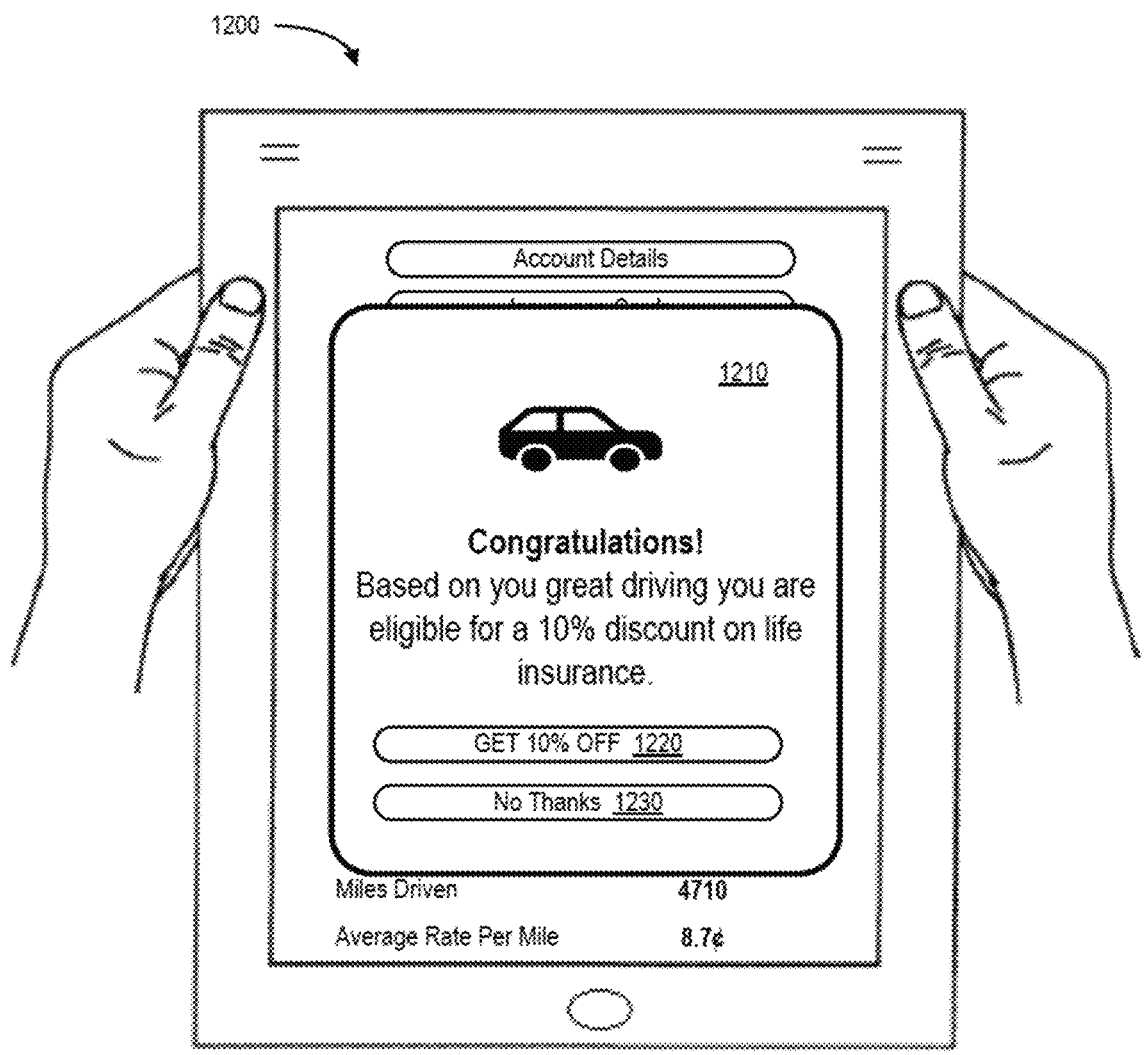
FIG. 12 is an upsell or cross-sell tablet display in accordance with some embodiments.

FIG. 11 is a savings announcement smartphone display 1100 according to some embodiments. In particular, the display 1100 includes a pop-up window 1110 informing the user about insurance savings earning view of collected telematics data. Selection of a "Close" icon 1120 may remove the pop-up window 1110 from the display 1100. In this way, the user interface can leverage telematics programs to engage with telematic-based offerings like rewards, discounts, pay as you drive, etc. to enhance relationship building. Moreover, telematics can move insurance from being an infrequent touchpoint to a daily interaction. FIG. 12 is an upsell or cross-sell tablet display 1200 in accordance with some embodiments. In particular, the display 1200 includes a pop-up window 1210 providing a life insurance offer based on collected telematics data. The user can then select a "GET 10% OFF" icon 1220 to pursue the offer or a "No Thanks" icon 1230 to remove the pop-up window 1210. With the user's attention, the application can offer them the right products at the right time.

Figure 13:
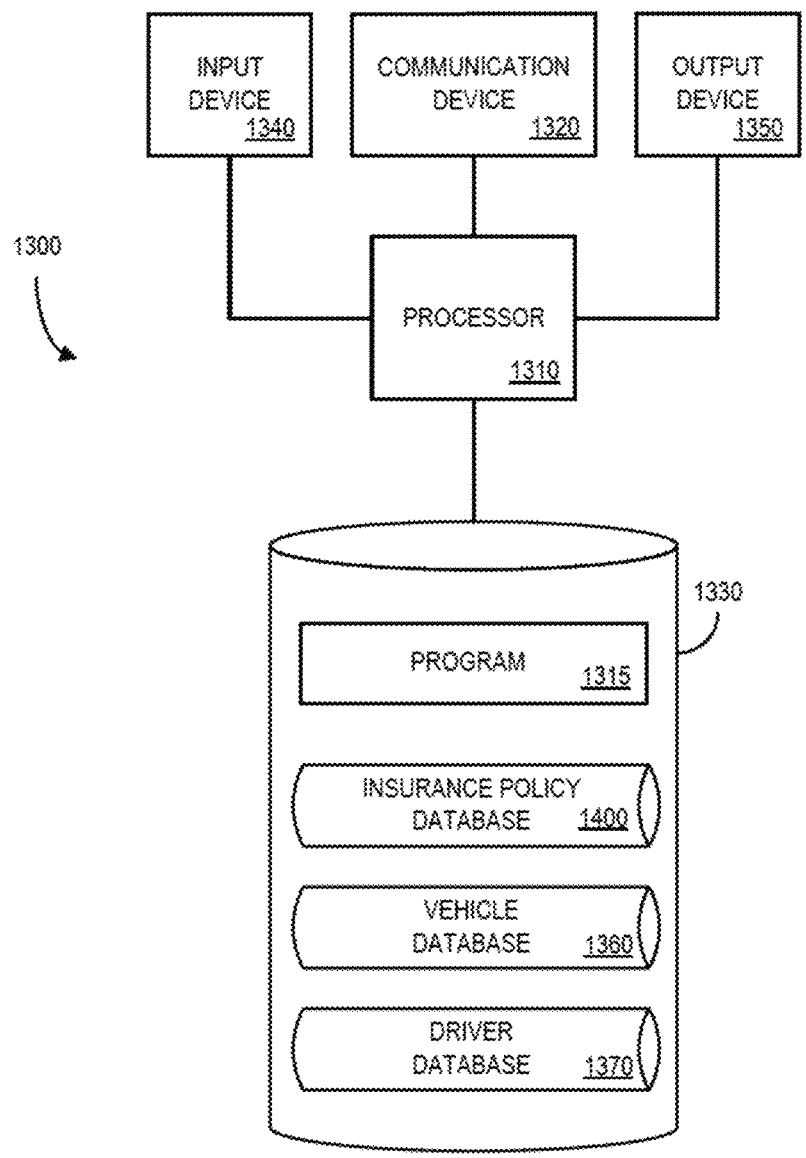
FIG. 13 is a block diagram of an apparatus according to some embodiments of the present invention.

The embodiments described herein may be implemented using any number of different hardware configurations. For example, FIG. 13 illustrates an apparatus 1300 that may be, for example, associated with system that utilizes telematics data associated with a machine. The apparatus 1300 comprises a processor 1310, such as one or more commercially available Central Processing Units ("CPUs") in the form of one-chip microprocessors, coupled to a communication device 1320 configured to communicate via a communication network (not shown in FIG. 13). The communication device 1320 may be used to communicate, for example, with one or more remote administrator computers, OBD-II devices, and or communication devices (e.g., PCs and smartphones). Note that communications exchanged via the communication device 1320 may utilize security features, such as those between a public internet user and an internal network of the insurance enterprise. The security features might be associated with, for example, web servers, firewalls, and/or PCI infrastructure. The apparatus 1300 further includes an input device 1340 (e.g., a mouse and/or keyboard to enter information about electronic wallet thresholds, telematics rules and machine learning algorithms, predictive analytics, etc.) and an output device 1350 (e.g., to output reports regarding insurance premium discounts, driving safety scores, etc.).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1315 and/or a telematics tool or application for controlling the processor 1310. The processor 1310 performs instructions of the program 1315, and thereby operates in accordance with any of the embodiments described herein. For example, the processor 1310 may monitor utilization of a machine. A device located proximate to the machine may include a plurality of sensors, each sensor configured to monitor at least one parameter (e.g., acceleration, speed, mileage, run-time and location sensors, etc.). The processor 1310 may calculate an operator behavior score and a machine operation score based on sensor signals. The processor 1310 may also determine a machine characteristics score and an amount of utilization associated with the machine. A risk relationship identifier associated with the machine may be identified, and the processor 1310 may automatically and dynamically update a resource amount associated with the risk relationship identifier based on the operator behavior score, the machine operation score, the machine characteristics score, and the amount of utilization associated with the machine.

The program 1315 may be stored in a compressed, uncompiled and/or encrypted format. The program 1315 may furthermore include other program elements, such as an operating system, a database management system, and/or device drivers used by the processor 1310 to interface with peripheral devices.

As used herein, information may be "received" by or "transmitted" to, for example: (i) the apparatus 1300 from another device; or (ii) a software application or module within the apparatus 1300 from another software application, module, or any other source.

In some embodiments (such as shown in FIG. 13), the storage device 1330 further stores an insurance policy database 1400, a vehicle database 1360, and a driver database 1370. Examples of a database that might be used in connection with the apparatus 1300 will now be described in detail with respect to FIG. 14. Note that the database described herein is only an example, and additional and/or different information may be stored therein. Moreover, various databases might be split or combined in accordance with any of the embodiments described herein. For example, the vehicle database 1360 and the driver database 1370 might be combined and/or linked to each other within the program 1315.

Referring to FIG. 14, a table is shown that represents the insurance policy database 1400 that may be stored at the apparatus 1400 according to some embodiments. The table may include, for example, entries associated with automobile insurance policies. The table may also define fields 1402, 1404, 1406, 1408, 1410, 1412 for each of the entries. The fields 1402, 1404, 1406, 1408, 1410, 1412 may, according to some embodiments, specify: a vehicle identifier 1402, a customer name and policy number 1404, a driver behavior score 1406, a vehicle operation score 1408, a vehicle characteristics score 1410, and an insurance premium 1412. The insurance policy database 1400 may be created and updated, for example, based on information electrically received from various computer systems, including those associated with insurance provider.

The vehicle identifier 1402 may be, for example, a unique alphanumeric code identifying a vehicle (e.g., an automobile to be insured). The customer name and policy number 1404 may identify, for example, an owner of the vehicle and insurance policy number. The driver behavior score 1406 might be calculated based on past driver actions, such as vehicle speed, vehicle acceleration, vehicle braking, distracted driving (e.g., talking on a telephone or texting while driving), a vehicle cornering characteristic, etc. The vehicle operation score 1408 might be calculated based on when and where the vehicle is being operated, such as a time of day, a location, a type of road, weather information, an amount of traffic, a distance to another vehicle, etc. The vehicle characteristics score 1410 might be calculated based on vehicle safety information, such as anti-lock brakes, cruise control, adaptive headlights, an autonomous operation feature (e.g., including a version number of driverless operation software), a camera, an automatic braking feature, a brake warning feature, a parking feature, a lane departure warning, etc. The insurance premium 1412 may then be calculated based on the driver behavior score 1406, the vehicle operation score 1408, and the vehicle characteristics score 1410 (e.g., and might represent an amount that will be charged per mile driven).

Figure 15:
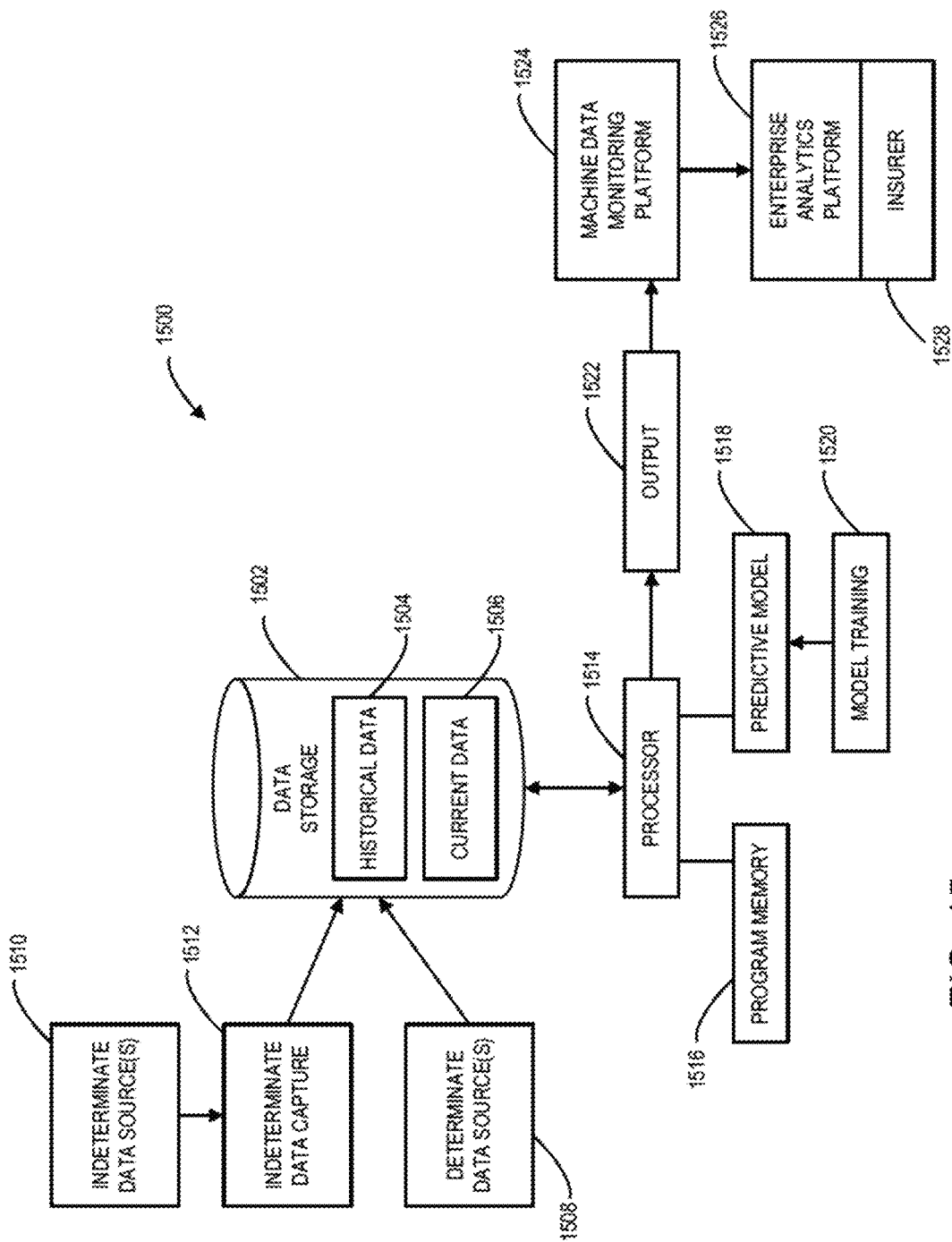
FIG. 15 illustrates a system associated with a predictive model according to some embodiments.

According to some embodiments, one or more predictive models may be used to generate insurance premium models, help underwrite insurance policies, and/or predict potential risk based on prior events and claims. Features of some embodiments associated with a predictive model will now be described by referring to FIG. 15. FIG. 15 is a partially functional block diagram that illustrates aspects of a computer system 1500 provided in accordance with some embodiments of the invention. For present purposes, it will be assumed that the computer system 1500 is operated by an insurance company (not separately shown) to support telematics data monitoring and processing.

The computer system 1500 includes a data storage module 1502. In terms of its hardware the data storage module 1502 may be conventional, and may be composed, for example, of one or more magnetic hard disk drives. A function performed by the data storage module 1502 in the computer system 1500 is to receive, store and provide access to both historical claim transaction data (reference numeral 1504) and current claim transaction data (reference numeral 1506). As described in more detail below, the historical claim transaction data 1504 is employed to train a predictive model to provide an output that indicates potential damage patterns, and the current claim transaction data 1506 is thereafter analyzed by the predictive model. Moreover, as time goes by, and results become known from processing current claim transactions, at least some of the current claim transactions may be used to perform further training of the predictive model. Consequently, the predictive model may thereby adapt itself to changing event impacts and updated telematics data (e.g., a new variable being monitored).

Either the historical claim transaction data 1504 or the current claim transaction data 1506 might include, according to some embodiments, determinate and indeterminate data. As used herein and in the appended claims, "determinate data" refers to verifiable facts such as the age of a vehicle; a vehicle type; an event type (e.g., an accident or breakdown); a date of loss, or date of report of claim, or policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about damages.

The determinate data may come from one or more determinate data sources 1508 that are included in the computer system 1500 and are coupled to the data storage module 1502. The determinate data may include "hard" data like a claimant's name, tax identifier umber, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 1510, and may be extracted from raw files or the like by one or more indeterminate data capture modules 1512. Both the indeterminate data source(s) 1510 and the indeterminate data capture module(s) 1512 may be included in the computer system 1500 and coupled directly or indirectly to the data storage module 1502. Examples of the indeterminate data source(s) 1510 may include data storage facilities for document images, for text files (e.g., claim handler notes), digitized recorded voice files (e.g., claimant oral statements, witness interviews, claim handler oral notes, etc.), streams of video information, etc. Examples of the indeterminate data capture module(s) 1512 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 1500 also may include a computer processor 1514. The computer processor 1514 may include one or more conventional microprocessors and may operate to execute programmed instructions to provide functionality as described herein. Among other functions, the computer processor 1514 may store and retrieve historical claim transaction data 1504 and current claim transaction data 1506 in and from the data storage module 1502. Thus, the computer processor 1514 may be coupled to the data storage module 1502.

The computer system 1500 may further include a program memory 1516 that is coupled to the computer processor 1514. The program memory 1516 may include one or more fixed storage devices, such as one or more hard disk drives, and one or more volatile storage devices, such as RAM devices. The program memory 1516 may be at least partially integrated with the data storage module 1502. The program memory 1516 may store one or more application programs, an operating system, device drivers, etc., all of which may contain program instruction steps for execution by the computer processor 1514.

The computer system 1500 further includes a predictive model component 1518. In certain practical embodiments of the computer system 1500, the predictive model component 1518 may effectively be implemented via the computer processor 1514, one or more application programs stored in the program memory 1516, and data stored as a result of training operations based on the historical claim transaction data 1504 (and possibly also data received from a third-party reporting service). In some embodiments, data arising from model training may be stored in the data storage module 1502, or in a separate data store (not separately shown). A function of the predictive model component 1518 may be to determine appropriate simulation models, results, and/or scores (e.g., a rating indicating how risky a road is as compared to similar roads). The predictive model component 1518 may be directly or indirectly coupled to the data storage module 1502.

The predictive model component 1518 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1500 includes a model training component 1520. The model training component 1520 may be coupled to the computer processor 1514 (directly or indirectly) and may have the function of training the predictive model component 1518 based on the historical claim transaction data 1504 and/or information about telematics, incidents, and alerts. (As will be understood from previous discussion, the model training component 1520 may further train the predictive model component 1518 as further relevant data becomes available.) The model training component 1520 may be embodied at least in part by the computer processor 1514 and one or more application programs stored in the program memory 1516. Thus, the training of the predictive model component 1518 by the model training component 1520 may occur in accordance with program instructions stored in the program memory 1516 and executed by the computer processor 1514.

In addition, the computer system 1500 may include an output device 1522. The output device 1522 may be coupled to the computer processor 1514. A function of the output device 1522 may be to provide an output that is indicative of (as determined by the trained predictive model component 1518) particular risk maps, events, insurance underwriting parameters, and recommendations. The output may be generated by the computer processor 1514 in accordance with program instructions stored in the program memory 1516 and executed by the computer processor 1514. More specifically, the output may be generated by the computer processor 1514 in response to applying the data for the current simulation to the trained predictive model component 1518. The output may, for example, be a monetary estimate, damage risk level, and/or likelihood within a predetermined range of numbers. In some embodiments, the output device may be implemented by a suitable program or program module executed by the computer processor 1514 in response to utilization of the predictive model component 1518.

Still further, the computer system 1500 may include a machine data monitoring platform 1524. The machine data monitoring platform 1524 may be implemented in some embodiments by a software module executed by the computer processor 1514. The machine data monitoring platform 1524 may have the function of rendering a portion of the display on the output device 1522. Thus, the machine data monitoring platform 1524 may be coupled, at least functionally, to the output device 1522. In some embodiments, for example, the machine data monitoring platform 1524 may direct workflow by referring, to an enterprise analytics platform 1526, telematics recommendations, modification recommendations, underwriting parameters, and/or alerts generated by the predictive model component 1518 and found to be associated with various results or scores. In some embodiments, this data may be provided to an insurer 1528 who may modify insurance parameters as appropriate.

Thus, embodiments may provide an automated and efficient way for remotely monitoring the use of a machine that provides secure, accurate results. Moreover, embodiments may revolutionize auto insurance by creating an ongoing relationship with the consumer that offers them greater control and transparency. Some embodiments are consumer focused and can create products that are valuable, simple, and engaging to the consumer. Moreover, embodiments may be adaptable and adjust insurance pricing and discounts as driving behaviors change over time. Embodiments may be resilient and help ensure that product offerings are not dependent on a specific vendor or source of telematics data. Further, embodiments may be connected and designed with speed of change and evolution of use in mind.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., boat insurance policies, motorcycle insurance policies, etc.). Similarly, although certain attributes were described in connection some embodiments herein, other types of attributes might be used instead.

According to some embodiments a risk score and/or driver signature data might be made available to another insurance company in connection with a future automobile insurance policy associated with the driver. For example, a driver's risk score might travel with him or her when they switch insurance companies (e.g., like a credit score might follow a person). A risk score might, in some embodiments, be associated with lead generation (e.g., to target better drivers with insurance offers) and/or gamified digital engagement to improve driving performance.

According to some embodiments, a risk score may be used to facilitate an incremental insurance policy. For example, an incremental insurance policy might be a "pay-per-mile" policy for infrequent drivers based on a number of miles driven. Similarly, an incremental insurance policy might instead be based on an amount of time spent driving (e.g., "pay-per-hour" insurance).

Figure 16:
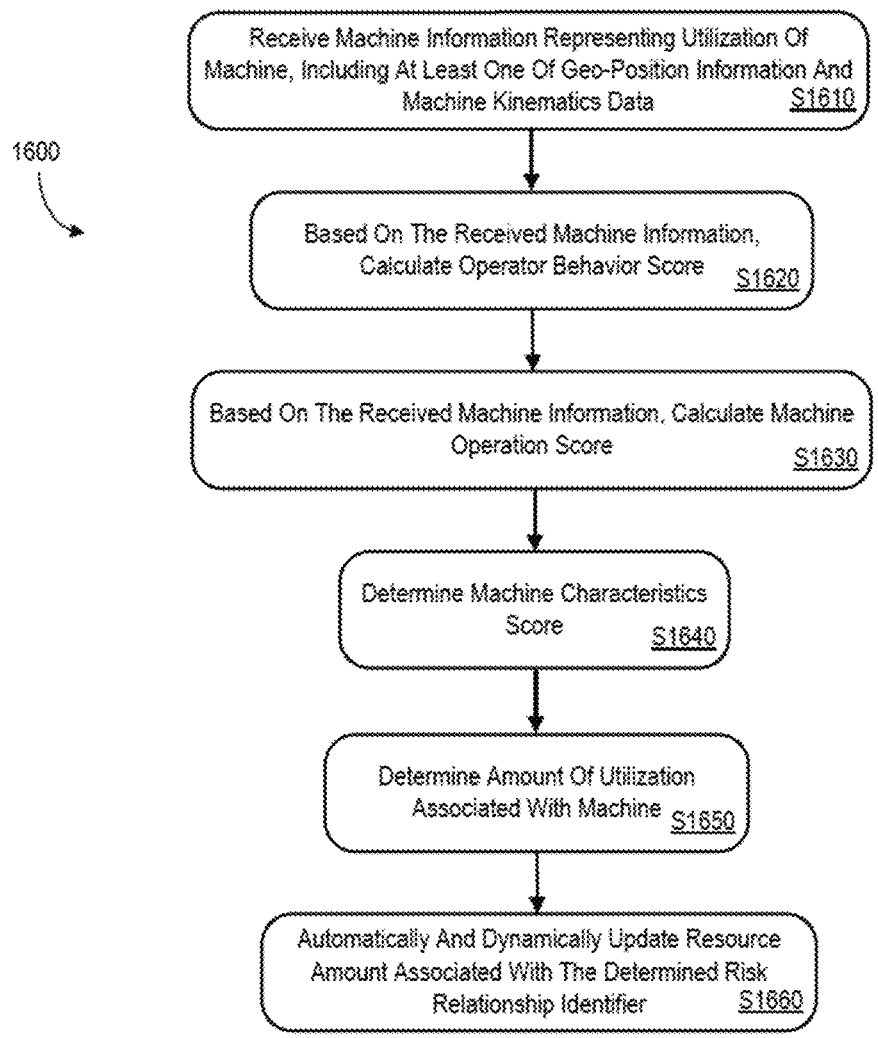
FIG. 16 is a driver feedback method in accordance with some embodiments.

Some embodiments described herein adjust an insurance premium, but embodiments may also be used for other purposes. For example, FIG. 16 is a driver feedback method 1600 according to some embodiments. At S1610, a computer server may receive machine information representing utilization of a machine, including at least one of geo-position information and machine kinematics data, via a distributed communication network. The machine might comprise, for example, an apparatus that creates widgets in a factory and machine information may be generated by sensors, such as a smartphone, a BLUETOOTH® tag, etc.

Based on the received machine information, at S1620 the system may calculate an operator behavior score (e.g., of a worker controlling the machine). Based on the received machine information, the system may also calculate a machine operation score at S1630 reflecting an amount of risk related that that operator controlling the machine. At S1640, the system may determine a machine characteristics score. The machine characteristics score might be associated with a safety feature (e.g., an automatic shut-off switch), a camera, etc.

At S1650, the system may determine an amount of utilization (e.g., a number of widgets that have been produced or a distance driven) associated with the machine. At S1660, the system may automatically and dynamically provide operator feedback based on the operator behavior score, the machine operation score, the machine characteristics score, and the amount of utilization associated with the machine. The operator feedback might, for example, suggest to the operator how they might more safely use the machine. According to some embodiments, the feedback may comprise a visual indication and/or an audible indication provided via a communication address associated with a mobile personal communication device (e.g., a smartphone number) of the operator of the machine. In some embodiments, the feedback is provided to cause a physical alteration of operation of the machine (e.g., applying brakes, lowering a volume of a radio, steering from a remote location, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A system configured to monitor utilization of a machine, comprising:
   a risk relationship data store containing electronic records that represent, for each of a plurality of risk relationships with an enterprise: a risk relationship identifier, at least one attribute value, and an initial resource amount;
   a device located proximate to the machine, including:
   a plurality of hardware sensors, each sensor configured to monitor at least one parameter, the plurality of sensors selected from acceleration, speed, mileage, run-time and location sensors, each sensor generating a sensor signal encapsulating the monitored parameter and transmitting the generated sensor signal,
   a control unit including a control unit memory that receives and stores the transmitted sensor signals and selectively combines the sensor signals, and
   a control unit transmitter coupled to the control unit that transmits the combined signal;
   a transceiver remote from the machine that receives the transmitted combined signal, and stores the combined signal in a memory unit, and a processor that processes the combined signal to capture the signal from each of the plurality of sensors, the transceiver including a back-end application computer server to:
   (i) calculate an operator behavior score based on the sensor signals,
   (ii) calculate a machine operation score based on the sensor signals,
   (iii) determine a machine characteristics score,
   (iv) determine an amount of utilization associated with the machine,
   (v) identify a risk relationship identifier associated with the machine,
   (vi) automatically and dynamically generate an updated resource amount different from the initial resource amount, the updated resource amount associated with the risk relationship identifier based on the operator behavior score, the machine operation score, the machine characteristics score, and the amount of utilization associated with the machine;
   (vii) automatically and dynamically generate feedback based on the operator behavior score, the machine operation score, the machine characteristics score, and the amount of utilization associated with the machine, and
   (viii) automatically and dynamically cause a physical alteration of operation of the machine in response to the feedback, wherein the physical alteration physically changes a state of operation of the machine from a first state to a second state and the first state is different from the second state; and
   an operator interface for providing an indication of the updated resource amount via a distributed communication network.

2. The system of claim 1, wherein the machine is a vehicle, the operator is a driver of the vehicle, and the utilization of the vehicle is associated with a distance driven by the vehicle.

3. The system of claim 2, wherein the enterprise is an insurer, the risk relationship is an automobile insurance policy, and the resource amount comprises an insurance premium of the automobile insurance policy.

4. The system of claim 3, wherein the operator behavior score is associated with at least one of: (i) vehicle speed, (ii) vehicle acceleration, (iii) vehicle braking, (iv) distracted driving, and (v) a vehicle cornering characteristic.

5. The system of claim 3, wherein the machine operation score is associated with at least one of: (i) a time of day, (ii) a location, (iii) a type of road, (iv) weather information, (v) an amount of traffic, (vi) a distance to another vehicle, (vii) operation of other machines in similar conditions, (viii) a risk hotspot, (ix) a distance to an intersection, and (x) a route familiarity characteristic.

6. The system of claim 3, wherein the machine characteristics score is associated with at least one of: (i) anti-lock brakes, (ii) cruise control, (iii) adaptive headlights, (iv) an autonomous operation feature, (v) a camera, (vi) an automatic braking feature, (vii) a brake warning feature, (viii) a parking feature, and (ix) a lane departure warning.

7. The system of claim 3, wherein the sensors include at least one of: (i) a smartphone, (ii) a tag, (iii) an On-Board Diagnostics ("OBD") device, and (iv) a device installed in the vehicle.

8. The system of claim 3, wherein the back-end application computer server is further to communicate with at least one of: (i) a claims engine, (ii) a reporting engine, (iii) a rating engine, and (iv) a digital engine.

9. The system of claim 3, wherein the back-end application computer server includes an account balance management engine adapted to perform at least one of: (i) maintain a payment card associated with the automobile insurance policy, (ii) automatically arrange for a payment based on the updated insurance premium, (iii) maintain a balance for the automobile insurance policy, (iv) manage a subscription for the automobile insurance policy, and (v) automatically initiate a payment when the balance falls below a pre-determined threshold amount.

10. The system of claim 3, wherein the automobile insurance policy comprises at least one of: (i) a potential automobile insurance policy, (ii) a newly issued automobile insurance policy, and (iii) an automobile insurance policy renewal.

11. The system of claim 3, wherein the back-end application computer server targets the driver with an insurance offer based on the sensor signals.

12. The system of claim 1, wherein the feedback is at least one of a visual indication and an audible indication provided via a communication address associated with a mobile personal communication device of the operator of the machine.

13. The system of claim 1 wherein the machine is a vehicle and physically altering operation of the vehicle includes at least one of: (i) applying brakes, (ii) lowering a volume of a radio, and (iii) steering from a remote location.

14. A computerized method associated with a risk relationship between an enterprise and an entity in connection with a machine, comprising:
accessing, by a back-end application computer server, a risk relationship data store that contains electronic records representing, for each of a plurality of risk relationships with an enterprise: a risk relationship identifier, at least one attribute value, and an initial resource amount;
receiving, at the back-end application computer server, machine information representing utilization of the machine, including at least one of geo-position information and machine kinematics data, via a distributed communication network;
determining a risk relationship identifier associated with the received machine information;
based on the received machine information, calculating an operator behavior score;
based on the received machine information, calculating a machine operation score;
determining a machine characteristics score;
determining an amount of utilization associated with the machine;
automatically and dynamically generating an updated resource amount different from the initial resource amount, the updated resource amount associated with the determined risk relationship identifier based on the operator behavior score, the machine operation score, the machine characteristics score, and the amount of utilization associated with the machine;
updating an appropriate electronic record in the risk relationship data store with the updated resource amount;
automatically and dynamically generating feedback based on the operator behavior score, the machine operation score, the machine characteristics score, and the amount of utilization associated with the machine; and
automatically and dynamically physically altering operation of the machine in response to the feedback, wherein the physical alteration physically changes a state of operation of the machine from a first state to a second state and the first state is different from the second state.

15. The method of claim 14, wherein the machine is a vehicle, the operator is a driver of the vehicle, and the utilization of the vehicle is associated with a distance driven by the vehicle.

16. The method of claim 15, wherein the enterprise is an insurer, the risk relationship is an automobile insurance policy, and the resource amount comprises an insurance premium of the automobile insurance policy.

17. The method of claim 16, wherein the operator behavior score is associated with at least one of: (i) vehicle speed, (ii) vehicle acceleration, (iii) vehicle braking, (iv) distracted driving, and (v) a vehicle cornering characteristic.

18. The method of claim 16, wherein the machine operation score is associated with at least one of: (i) a time of day, (ii) a location, (iii) a type of road, (iv) weather information, (v) an amount of traffic, (vi) a distance to another vehicle, (vii) operation of other machines in similar conditions, (viii) a risk hotspot, (ix) a distance to an intersection, and (x) a route familiarity characteristic.

19. The method of claim 16, wherein the machine characteristics score is associated with at least one of: (i) anti-lock brakes, (ii) cruise control, (iii) adaptive headlights, (iv) an autonomous operation feature, (v) a camera, (vi) an automatic braking feature, (vii) a brake warning feature, (viii) a parking feature, and (ix) a lane departure warning.

20. The method of claim 16, wherein the machine information is received from a plurality of sensors including at least one of: (i) a smartphone, (ii) a tag, (iii) an On-Board Diagnostics ("OBD") device, and (iv) a device installed in the vehicle.

21. The method of claim 16, wherein the back-end application computer server is further to communicate with at least one of: (i) a claims engine, (ii) a reporting engine, (iii) a rating engine, and (iv) a digital engine.

22. The method of claim 16, wherein the back-end application computer server includes an account balance management engine adapted to perform at least one of: (i) maintain a payment card associated with the automobile insurance policy, (ii) automatically arrange for a payment based on the updated insurance premium, (iii) maintain a balance for the automobile insurance policy, (iv) manage a subscription for the automobile insurance policy, and (v) automatically initiate a payment when the balance falls below a pre-determined threshold amount.

23. The method of claim 16, wherein the automobile insurance policy comprises at least one of: (i) a potential automobile insurance policy, (ii) a newly issued automobile insurance policy, and (iii) an automobile insurance policy renewal.

\* \* \* \* \*